(12) United States Patent
Nelapati et al.

(10) Patent No.: US 10,387,732 B2
(45) Date of Patent: Aug. 20, 2019

(54) METHOD AND APPARATUS FOR POSITION ERROR DETECTION

(71) Applicant: GM GLOBAL TECHNOLOGY OPERATIONS LLC, Detroit, MI (US)

(72) Inventors: Praneeth Nelapati, Farmington Hills, MI (US); Douglas A. Donaldson, Bloomfield Hills, MI (US); Curtis L. Hay, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 15/624,186

(22) Filed: Jun. 15, 2017

(65) Prior Publication Data
US 2018/0365500 A1    Dec. 20, 2018

(51) Int. Cl.
| | |
|---|---|
| *G01C 21/30* | (2006.01) |
| *G06K 9/00* | (2006.01) |
| *G01C 21/32* | (2006.01) |
| *G01S 19/23* | (2010.01) |
| *G01S 19/14* | (2010.01) |
| *G01S 19/48* | (2010.01) |
| *G01C 21/28* | (2006.01) |
| *G06K 9/46* | (2006.01) |

(52) U.S. Cl.
CPC ......... *G06K 9/00791* (2013.01); *G01C 21/28* (2013.01); *G01C 21/30* (2013.01); *G01C 21/32* (2013.01); *G01S 19/14* (2013.01); *G01S 19/23* (2013.01); *G01S 19/48* (2013.01); *G06K 9/46* (2013.01)

(58) Field of Classification Search
CPC ...... G06K 9/00791; G06K 9/46; G01S 19/14; G01S 19/23; G01S 19/48; G01C 21/32; G05D 1/0088
See application file for complete search history.

(56) References Cited

U.S. PATENT DOCUMENTS

| | | | |
|---|---|---|---|
| 9,623,905 B2* | 4/2017 | Shashua | G01C 21/32 |
| 9,631,936 B2* | 4/2017 | Shashua | G01C 21/32 |
| 9,631,943 B2* | 4/2017 | Shashua | G01C 21/32 |
| 9,665,100 B2* | 5/2017 | Shashua | G01C 21/32 |

(Continued)

OTHER PUBLICATIONS

Wimmershoff et al., Sensitivity analysis for model based fusion of camera systems with navigation data, 2013, IEEE, pp. 69-75 (Year: 2013).*

(Continued)

*Primary Examiner* — McDieunel Marc

(57) ABSTRACT

A method and apparatus for determining an error in global navigation information are provided. The apparatus includes at least one memory including computer executable instructions and at least one processor configured to read and execute the computer executable instructions. The computer executable instructions causing the at least one processor to detect a position based on a global navigation information, determine at least one from among a lateral error and longitudinal error at the detected position based on high resolution mapping data, determine an adjustment value based on determined at least one from among the lateral error and the longitudinal error, and transmit or store the adjustment value and the detected position corresponding to the adjustment value.

11 Claims, 4 Drawing Sheets

(56) References Cited

U.S. PATENT DOCUMENTS

| | | | | |
|---|---|---|---|---|
| 9,690,293 B2* | 6/2017 | Shashua | ............... | G01C 21/32 |
| 9,696,719 B2* | 7/2017 | Aviel | ............... | G01C 21/32 |
| 9,709,986 B2* | 7/2017 | Gdalyahu | ............... | G01C 21/32 |
| 9,760,090 B2* | 9/2017 | Shashua | ............... | G01C 21/32 |
| 9,817,399 B2* | 11/2017 | Braunstein | ............... | G01C 21/32 |
| 10,198,001 B2* | 2/2019 | Shashua | ............... | G05D 1/0088 |
| 2017/0008521 A1* | 1/2017 | Braunstein | ............... | G01C 21/32 |
| 2017/0336792 A1* | 11/2017 | Gdalyahu | ............... | G01C 21/32 |
| 2017/0364082 A1* | 12/2017 | Taieb | ............... | G01C 21/32 |

OTHER PUBLICATIONS

Flade et al., Lane Detection Based Camera to Map Alignment Using Open-Source Map Data, 2018, IEEE, pp. 890-897 (Year: 2018).*

Weon et al., Precise localization of a vehicle within a driving lane by combining the vehicle trajectory with vision information, 2016, IEEE, pp. 1010-1015 (Year: 2016).*

Zakaria et al., Dynamic curvature path tracking control for autonomous vehicle: Experimental results, 2014, IEEE, pp. 264-269 (Year: 2014).*

* cited by examiner

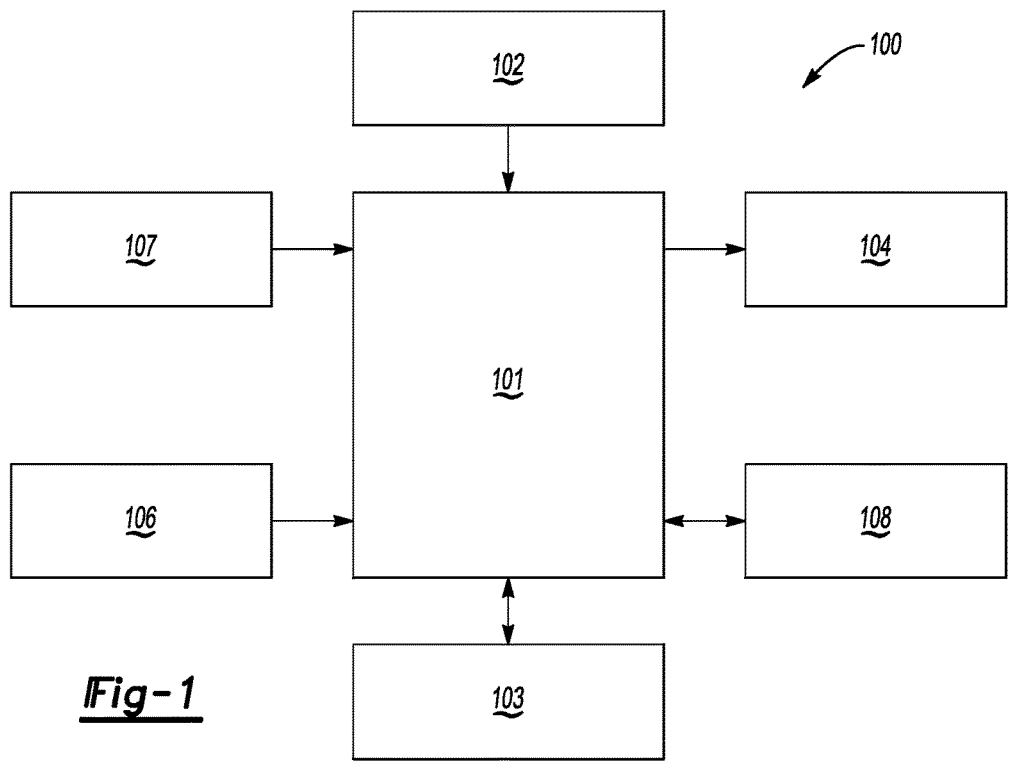
_Fig-1_
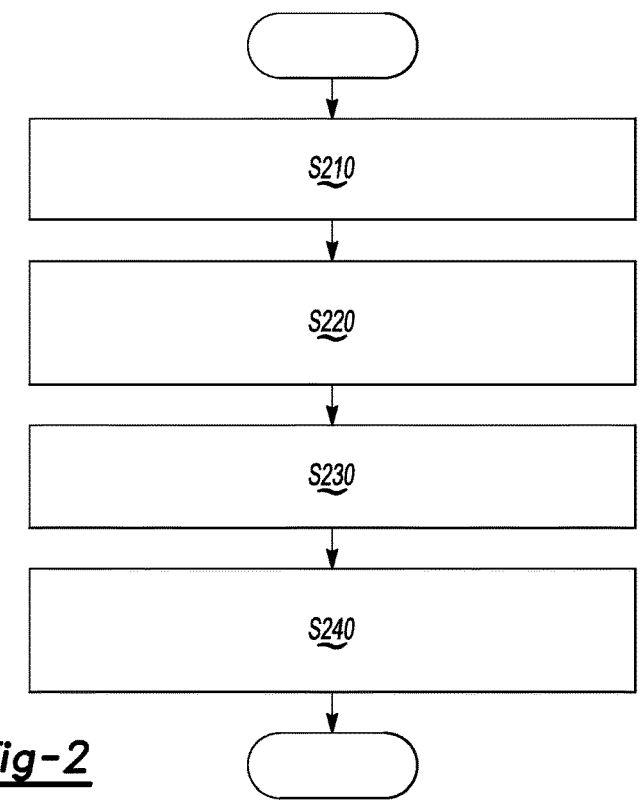
_Fig-2_

METHOD AND APPARATUS FOR POSITION ERROR DETECTION

INTRODUCTION

Apparatuses and methods consistent with exemplary embodiments relate to detecting a position of a vehicle on a road. More particularly, apparatuses and methods consistent with exemplary embodiments relate to correcting a detected position of a vehicle on road or path.

SUMMARY

One or more exemplary embodiments provide a method and an apparatus that detect a position of vehicle using global navigation information and determine an error in the detected position based on high resolution mapping information. More particularly, one or more exemplary embodiments provide a method and an apparatus that determine a lateral error and a longitudinal error in a position determined from global navigation by using high resolution mapping information and/or vehicle sensors.

According to an aspect of exemplary embodiment, a method for determining an error in global navigation information is provided. The method includes detecting a position based on a global navigation information, analyzing high resolution mapping data corresponding to the detected position to determine first curvature information of a path corresponding to the detected position, analyzing data from a sensor to determine second curvature information of a path around the sensor, comparing the first curvature information to the second curvature information to determine whether there is an error in the detected position, in response to determining that there is an error in detected position, aligning the first curvature information and the second curvature information and determining an adjustment value used to align the first curvature information and the second curvature information, and adjusting the detected position based on the adjustment value.

The high resolution mapping data may include mapping data compiled a light imaging, detection and ranging sensor and stored in memory.

The sensor may be imaging sensor configured to capture an image of the path.

The comparing the first curvature information to the second curvature information to determine whether there is an error in the detected position may include determining whether curvature data at a position of the first curvature information corresponds to curvature data at a corresponding position of the second curvature information.

The adjustment value used to align the first curvature and the second curvature may include a longitudinal offset added to a position of at least one from among the first curvature information and the second curvature information.

The method may include transmitting or storing the adjustment value and the detected position corresponding to the adjustment value.

The global navigation information may include at least one from among GPS information, GLONASS information, BeiDou information, Compass information, IRNSS information and information from a wireless communication or satellite based navigation system.

According to an aspect of an exemplary embodiment, a method for determining an error in global navigation information is provided. The method includes detecting a first position based on a global navigation information, analyzing high resolution mapping data corresponding to the detected first position to determine a first lateral distance between a first side of the detected first position and a first side of the path lateral to the detected first position and a second lateral distance between a second side of the detected first position and a second side of the path lateral to the detected first position, detecting a second position based on a global navigation information, analyzing high resolution mapping data corresponding to the detected second position to determine a third lateral distance between the first side of the detected second position and the first side of the path lateral to the detected second position and a fourth lateral distance between the second side of the detected second position and the second side of the path lateral to the detected second position, and determining an error in the first position based on at least two from among the first lateral distance, the second lateral distance, the third lateral distance and the fourth lateral distance.

The high resolution mapping data may include mapping data compiled from a light imaging, detection and ranging sensor and stored in memory.

The determining the error in the first position may include determining the error based on the difference based on a difference between the first lateral distance and third lateral distance.

The determining the error in the first position may include determining the error based on the difference based on a difference between the second lateral distance and fourth lateral distance.

The method may further include determining an adjustment value to adjust the detected first position based on the determined error and transmitting or storing the adjustment value and the detected first position corresponding to the adjustment value.

The adjustment value may include a lateral offset added to the detected first position.

The global navigation information may include at least one from among GPS information, GLONASS information, BeiDou information, Compass information, IRNSS information and information from a wireless communication or satellite based navigation system.

According to an aspect of an exemplary embodiment, an apparatus that determines an error in global navigation information. The apparatus includes at least one memory including computer executable instructions and at least one processor configured to read and execute the computer executable instructions. The computer executable instructions causing the at least one processor to detect a first position based on a global navigation information, determine at least one from among a lateral error and longitudinal error at the detected first position based on high resolution mapping data, determine an adjustment value based on determined at least one from among the lateral error and the longitudinal error, and transmit or store the adjustment value and the detected first position corresponding to the adjustment value.

The computer executable instructions cause the at least one processor to determine the lateral error at the detected first position by analyzing high resolution mapping data corresponding to the detected first position to determine a first lateral distance between a first side of the detected first position and a first side of the path lateral to the detected first position and a second lateral distance between a second side of the detected first position and a second side of the path lateral to the detected first position, detecting a second position based on a global navigation information, analyzing high resolution mapping data corresponding to the detected second position to determine a third lateral distance between the first side of the detected second position and the first side of the path lateral to the detected second position and a fourth lateral distance between the second side of the detected second position and the second side of the path lateral to the detected second position, and determining the lateral error in the first position based on at least two from among the first lateral distance, the second lateral distance, the third lateral distance and the fourth lateral distance.

The computer executable instructions cause the at least one processor to determine the longitudinal error at the detected first position by analyzing high resolution mapping data corresponding to the detected first position to determine first curvature information of a path corresponding to the detected first position, analyzing data from a sensor that senses second curvature information of a path around the sensor, comparing the first curvature information to the second curvature information to determine whether there is an error in the detected position, and in response to determining that there is an error in detected position, aligning the first curvature information and the second curvature information and determining the adjustment value used to align the first curvature information and the second curvature information.

The global navigation information may include at least one from among GPS information, GLONASS information, BeiDou information, Compass information, IRNSS information and information from a wireless communication or satellite based navigation system, and the high resolution mapping data may include mapping data compiled from a light imaging, detection and ranging sensor and stored in memory.

Other objects, advantages and novel features of the exemplary embodiments will become more apparent from the following detailed description of exemplary embodiments and the accompanying drawings.

BRIEF DESCRIPTION OF THE DRAWINGS

FIG. 1 shows a block diagram of an apparatus that determines an error in a position determined based on global navigation information according to an exemplary embodiment;

FIG. 2 shows a flowchart for a method of determining an error in a position determined based on global navigation information according to an exemplary embodiment;

DETAILED DESCRIPTION OF EXEMPLARY EMBODIMENTS

Figure 3:
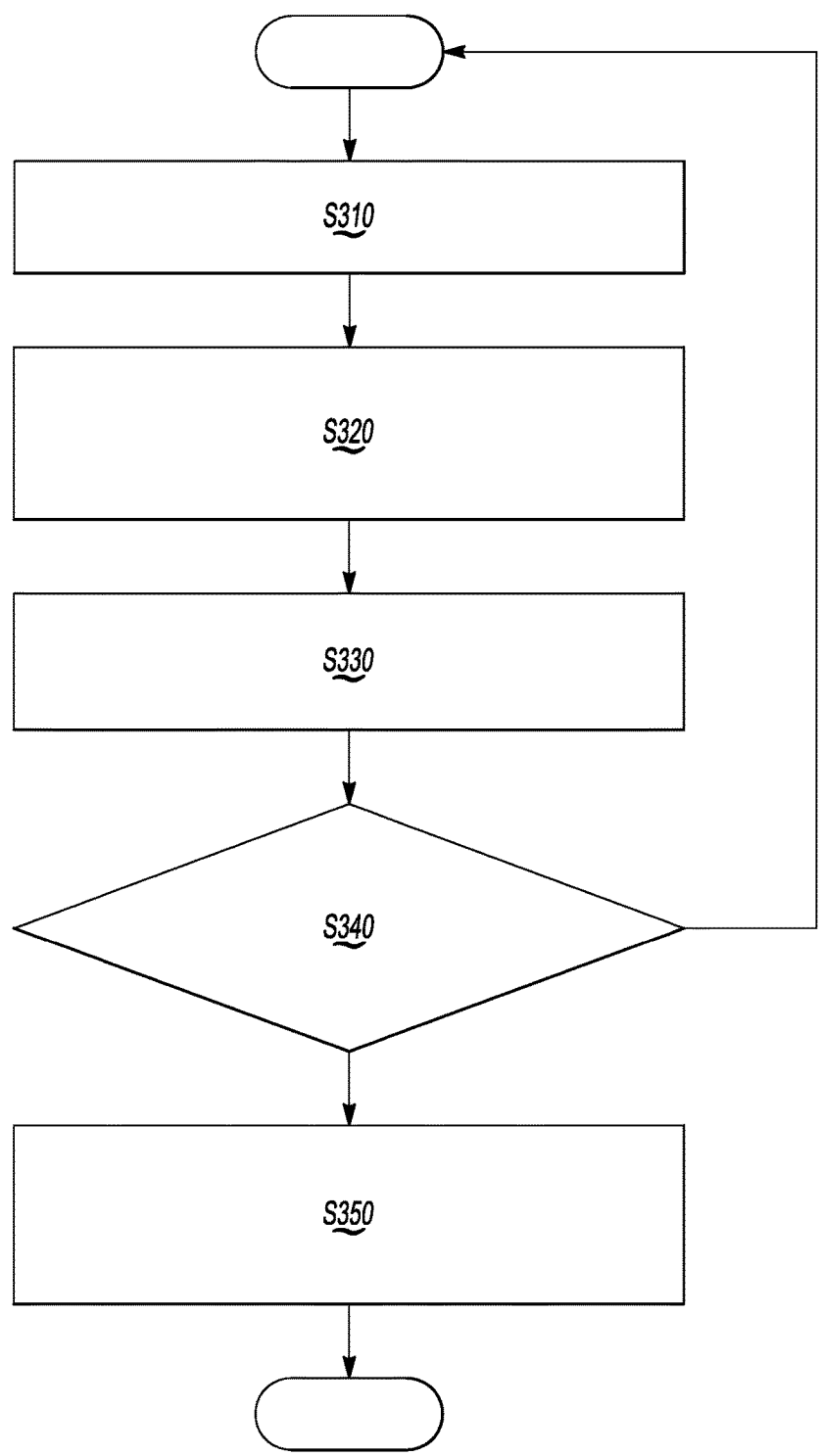
FIG. 3 shows a flowchart for a method of determining an error in a position determined based on global navigation information according to an exemplary embodiment.

An apparatus and method for determining an error in a position determined from global navigation information will now be described in detail with reference to FIGS. 1-6 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with communication devices sensors that are capable of providing information to determine a position of the vehicle and to detect conditions of an environment around a vehicle. The sensors provide information on conditions or features of location of a vehicle and this information may be used to control the vehicle or to assist an operator of a vehicle. In one example, sensors or communication devices may provide global navigation information that includes a position of a vehicle. However, there may be an error in the position of the vehicle due to environmental factors affecting the sensor or communication device.

One way to address this issue is to determine and correct the error in the position of the vehicle that is determined from global navigation information by using imaging information or high resolution mapping information. The high resolution mapping information may be analyzed to determine whether there is a discrepancy between the position of the vehicle determined from global navigation information and the high resolution mapping information. As such, high resolution mapping information may be used in addition to sensor information or global navigation information from sensors or communication devices of a vehicle to make a more accurate determination as to the position and location of the vehicle.

This more accurate determination of road layer position may be used to provide better navigation information, autonomous vehicle control, and map creation. In one example, global navigation information may be corrected at certain locations. In another example, an autonomous vehicle may better be able to navigate by determining a more accurate position from the global navigation information.

FIG. 1 shows a block diagram of an apparatus that determines an error in a position determined based on global navigation information 100 (i.e., an apparatus that determines an error in global navigation information 100). As shown in FIG. 1, the apparatus that determines an error in global navigation information 100, according to an exemplary embodiment, includes a controller 101, a power supply 102, a storage 103, an output 104, a user input 106, a sensor 107, and a communication device 108. However, the apparatus that determines an error in global navigation information 100 is not limited to the aforementioned configuration and may be configured to include additional elements and/or omit one or more of the aforementioned elements. The apparatus that determines an error in global navigation information 100 may be implemented as part of a vehicle, as a standalone component, as a hybrid between an on vehicle and off vehicle device, or in another computing device.

The controller 101 controls the overall operation and function of the apparatus that determines an error in global navigation information 100. The controller 101 may control one or more of a storage 103, an output 104, a user input 106, a sensor 107, and a communication device 108 of the apparatus that determines an error in global navigation information 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the sensor 107, and the communication device 108 of the apparatus that determines an error in global navigation information 100. The information may be sent and received via a bus or network, or may be directly read or written to/from one or more of the storage 103, the output 104, the user input 106, the sensor 107, and the communication device 108 of the apparatus that determines an error in global navigation information 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the sensor 107, and the communication device 108, of the apparatus that determines an error in global navigation information 100. The power supply 102 may include one or more from among a battery, an outlet, a capacitor, a solar energy cell, a generator, a wind energy device, an alternator, etc.

The storage 103 is configured for storing information and retrieving information used by the apparatus that determines an error in global navigation information 100. The storage 103 may be controlled by the controller 101 to store and retrieve information received from the controller 101, the sensor 107, and/or the communication device 108. The information may include global navigation information, adjustment information or an adjustment value, sensor information, high resolution mapping information (i.e. high-resolution mapping data), etc. The storage 103 may also store the computer instructions configured to be executed by a processor to perform the functions of the apparatus that determines an error in global navigation information 100.

The global navigation information may include one or more from among GPS information, GLONASS information, BeiDou information, Compass information, IRNSS information and information from a wireless communication or satellite based navigation system. The global navigation information may also include a position determined from a global navigation signal (GNS). The GNS signal may be a GPS signal or other GNS signal. GNS systems may include GPS, GLONASS, BeiDou, Compass, IRNSS and/or any other wireless communication or satellite based navigation system.

The imaging information or high resolution mapping information may include an image of an environment corresponding to the location of the vehicle, a path in front of a vehicle or sensor, or a path around a vehicle or sensor. The imaging information or high resolution mapping information may be used to determine curvature information of a path and lateral distance from each side of a vehicle to a corresponding wall or side of the path. The curvature information may include one or more data points representing the trajectory and/or slope of a path, road, highway, etc. In one example, the high resolution mapping information or data may be include one or more from among three-dimensional point cloud information, mapping data compiled form an imaging sensor, and mapping data compiled from light imaging, detection and ranging sensor.

The adjustment information or adjustment value may be a value used to adjust one or more from among a longitudinal error or a longitudinal position determined from the global navigation information and a lateral error or a lateral position determined from the global navigation information. The longitudinal error is an error in a position with respect to the length of the road and a lateral error is an error in a position with respect to the width of the road. For example, the adjustment information or adjustment value may be used to align a first curvature determined from a sensor and a second curvature determined from high resolution mapping data to determine an adjustment value to adjust a position of a vehicle with respect to a length of the road. According to another example, the adjustment information or adjustment value may be used to be a lateral offset used to correct a lateral position of a vehicle on a path.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that determines an error in global navigation information 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notifications may indicate information on a position of a vehicle or a location of a vehicle. Moreover, the output 104 may output navigation information based on the position of a vehicle and/or a location of a vehicle.

The user input 106 is configured to provide information and commands to the apparatus that determines an error in global navigation information 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The sensor 107 may be configured to scan an area around a vehicle to detect and provide imaging information including an image of the area around the vehicle. The sensor 107 may be used to compile imaging information or high resolution mapping information or data may including three-dimensional point cloud information.

The communication device 108 may be used by the apparatus that determines an error in global navigation information 100 to communicate with various types of external apparatuses according to various communication methods. The communication device 108 may be used to send/receive information including the information on a location of a vehicle, global navigation information, image sensor information and the adjustment information or adjustment value, etc.

The communication device 108 may include various communication modules such as one or more from among a telematics unit, a broadcast receiving module, a near field communication (NFC) module, a GNS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GNS receiver is a module that receives a GNS signal from a GPS satellite or other navigation satellite or tower and that detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that determines an error in global navigation information 100 may be configured to detect a position based on a global navigation information, analyze high resolution mapping data corresponding to the detected position to determine first curvature information of a path corresponding to the detected position, analyze data from a sensor that senses second curvature information of a path around the sensor, compare the first curvature information to the second curvature information to determine whether there is an error in the detected position, in response to determining that there is an error in detected position, aligning the first curvature information and the second curvature information and determining an adjustment value used to align the first curvature information and the second curvature information, and adjust the detected position based on the adjustment value.

The controller 101 of the apparatus that determines an error in global navigation information 100 may be further configured to compare the first curvature information to the second curvature information to determine whether there is an error in the detected position by determining whether curvature data at a position of the first curvature information corresponds to curvature data at a corresponding position of the second curvature information.

According to an exemplary embodiment, the controller 101 of the apparatus that determines an error in global navigation information 100 may be configured to detect a first position based on a global navigation information, analyze high resolution mapping data corresponding to the detected first position to determine a first lateral distance between a first side of the detected first position and a first side of the path lateral to the detected first position and a second lateral distance between a second side of the detected first position and a second side of the path lateral to the detected position, detect a second position based on a global navigation information, analyze high resolution mapping data corresponding to the detected second position to determine a third lateral distance between the first side of the detected second position and the first side of the path lateral to the detected second position and a fourth lateral distance between the second side of the detected second position and the second side of the path lateral to the detected position, and determine an error in the first position based on at least two from among the first lateral distance, the second lateral distance, the third lateral distance and the fourth lateral distance.

The controller 101 of the apparatus that determines an error in global navigation information 100 may be further configured to determine an adjustment value to adjust the detected first position based on the determined error and transmit or store the adjustment value and the detected first position corresponding to the adjustment value. The adjustment value may be retrieved by the controller 101 to provide position information displayed on a map or navigation information from position determined based on the adjustment value.

The controller 101 of the apparatus that determines an error in global navigation information 100 may be further configured to determine the error in the first position based on a difference between the second lateral distance and fourth lateral distance or the difference based on a difference between the first lateral distance and third lateral distance.

According to an exemplary embodiment, the controller 101 of the apparatus that determines an error in global navigation information 100 may be configured to detect a first position based on a global navigation information, determine at least one from among a lateral error and longitudinal error at the detected first position based on high resolution mapping data, determine an adjustment value based on determined at least one from among the lateral error and the longitudinal error, and transmit or store the adjustment value and the detected first position corresponding to the adjustment value.

The controller 101 of the apparatus that determines an error in global navigation information 100 may be further configured to determine an adjustment value to adjust the detected first position based on the determined error and transmit or store the adjustment value and the detected first position corresponding to the adjustment value.

FIG. 2 shows a flowchart for a method of determining an error in a position determined based on global navigation information according to an exemplary embodiment. The method of FIG. 2 may be performed by the apparatus that determines an error in global navigation information 100 or may be encoded into a computer readable medium as instructions that are executable by a computer to perform the method.

Referring to FIG. 2, a position is detected based on global navigation information in operation S210. The position may be a position of a vehicle such as an automobile, motorcycle, truck, etc. In operation S220, it is determined whether there exists a lateral error or a longitudinal error in the detected position based on high resolution mapping data.

An adjustment value is then determined based on the determined lateral error or longitudinal error in operation S230. The adjustment value may be a value used to adjust the position laterally or longitudinally to account for a determined error. In operation S240, the determined adjustment value is transmitted or stored along with the detected position corresponding to the adjustment value. The adjustment value may be used to correct the detected position of the vehicle.

FIG. 3 shows a flowchart for a method of determining an error in a position determined based on global navigation information according to an exemplary embodiment. The method of FIG. 3 may be performed by the apparatus that determines an error in global navigation information 100 or may be encoded into a computer readable medium as instructions that are executable by a computer to perform the method.

Referring to FIG. 3, a position is detected based on global navigation information in operation S310. High resolution mapping data corresponding to the detected position is analyzed to determine a first curvature information of a path corresponding to the detected position in operation S320. Sensor data from a second sensor is analyzed to determine second curvature information of a path corresponding to the detected position in operation S330.

In operation S340, the first curvature information is compared to the second curvature information to determine whether there is an error in the position detected from the global navigation information. If there is no error (operation S340-NO), the process restarts. However, if an error is detected (operation S340-YES), the first curvature information and second curvature information are aligned and an adjustment value used to align first curvature information and second curvature information is determined in operation S350.

Figure 4:
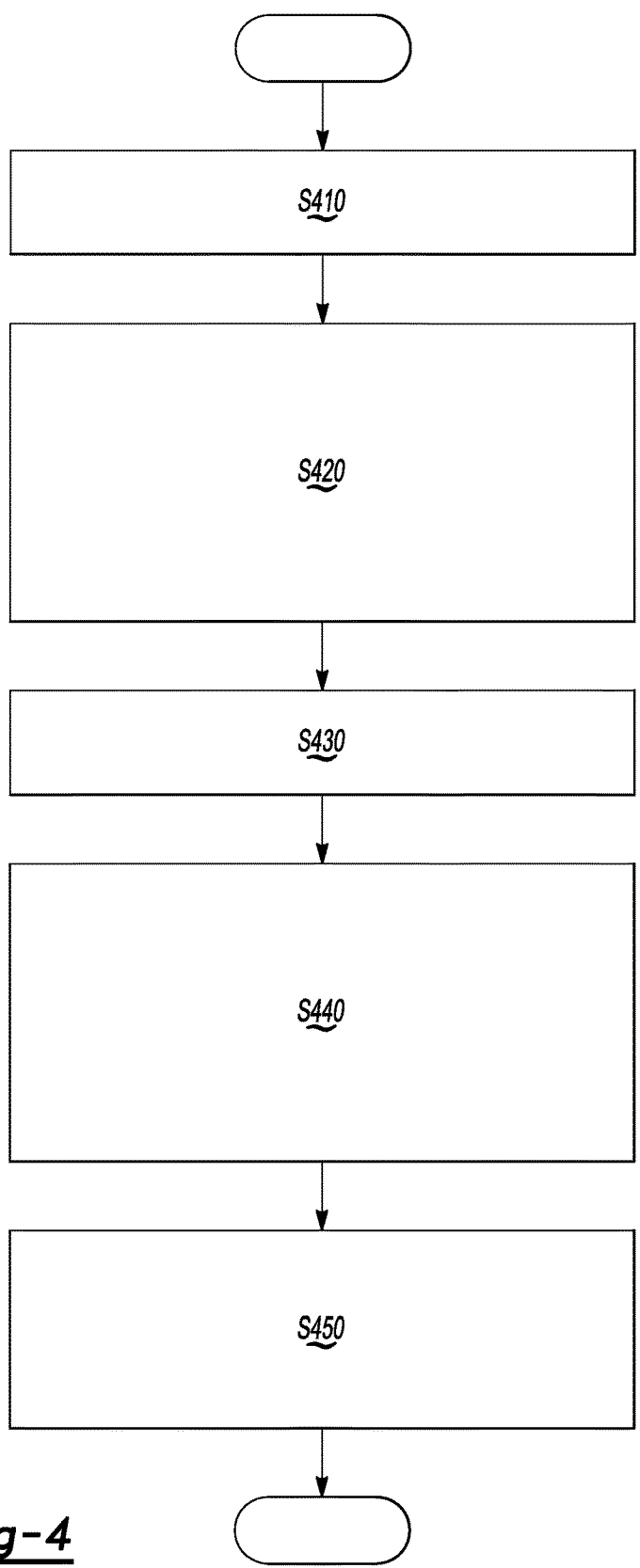
FIG. 4 shows a flowchart for a method of determining an error in a position determined based on global navigation information according to an exemplary embodiment.

FIG. 4 shows a flowchart for a method of determining an error in a position determined based on global navigation information according to an exemplary embodiment. The method of FIG. 4 may be performed by the apparatus that determines an error in global navigation information 100 or may be encoded into a computer readable medium as instructions that are executable by a computer to perform the method.

Referring to FIG. 4, a first position is detected from on global navigation information in operation S410. In operation S420, high resolution mapping data corresponding to detected first position is analyzed to determine a first lateral distance between a first side of the detected first position and a first side of the path lateral to detected first position and a second lateral distance between a second side of the detected first position and a second side of the path lateral to the detected first position.

In operation S430, a second position is detected from on global navigation information. Then, high resolution mapping data corresponding to the detected second position is analyzed to determine a third lateral distance between the first side of the detected second position and the first side of path lateral to the detected second position and a fourth lateral distance between the second side of the detected second position and the second side of the path lateral to the detected second position. In operation S440, an error in the detected first position is determined based on at least one from among the first lateral distance and the second lateral distance, and at least one form among the third lateral distance and the fourth lateral distance.

Figure 5:
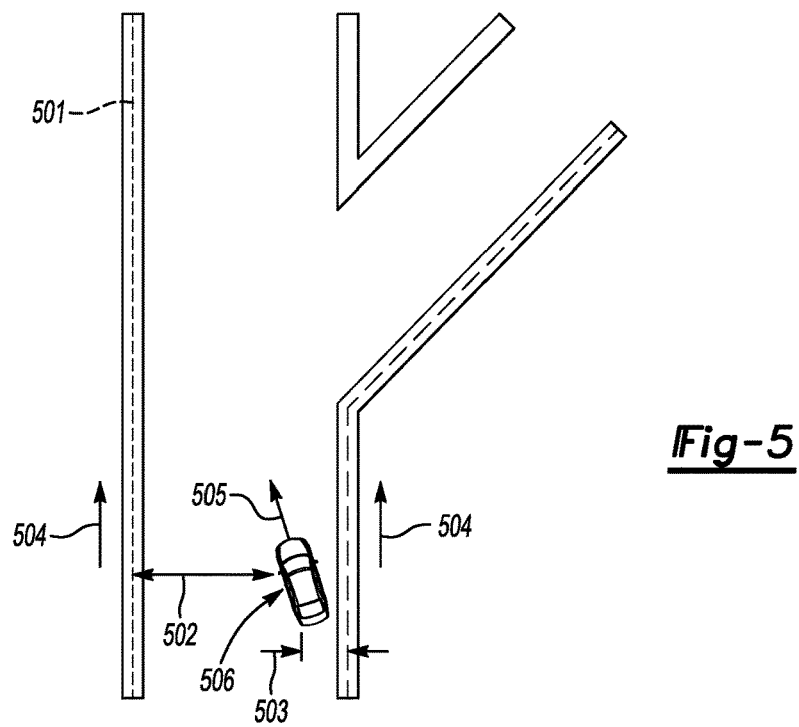
FIG. 5 shows an illustration of determining a lateral error in a position determined from global navigation information according to an aspect of an exemplary embodiment.

FIG. 5 shows an illustration of determining a lateral error in a position determined from global navigation information according to an aspect of an exemplary embodiment. Referring to FIG. 5, a position and heading of a vehicle 506 are detected in path 501. Based on this detected position and heading, a first lateral distance 502 between the vehicle and a first lateral side of a path and a second lateral distance 503 between the vehicle and a second lateral side of the path may be determined. The position and heading of a vehicle 506, the first lateral distance 502, and the second lateral distance 503 may be determined a different points in time 504 along the path based on the trajectory of path to determine whether there is an error in the global navigation information.

In one example, a plurality of values for the position and heading of the vehicle 506, the corresponding first lateral distance 502 and the corresponding second lateral distance 503 may be determined. This information may be used to determine an error in the position of the vehicle provided by the global navigation information. For example, lateral distances at each point in time may be added up to determine whether the total distance corresponds to the width of the path. In another example, lateral distances at different points in time may be compared to each other and to the width of the path to determine which of the lateral distances are accurate and to determine an adjustment value to correct the position of the vehicle.

Figure 6:
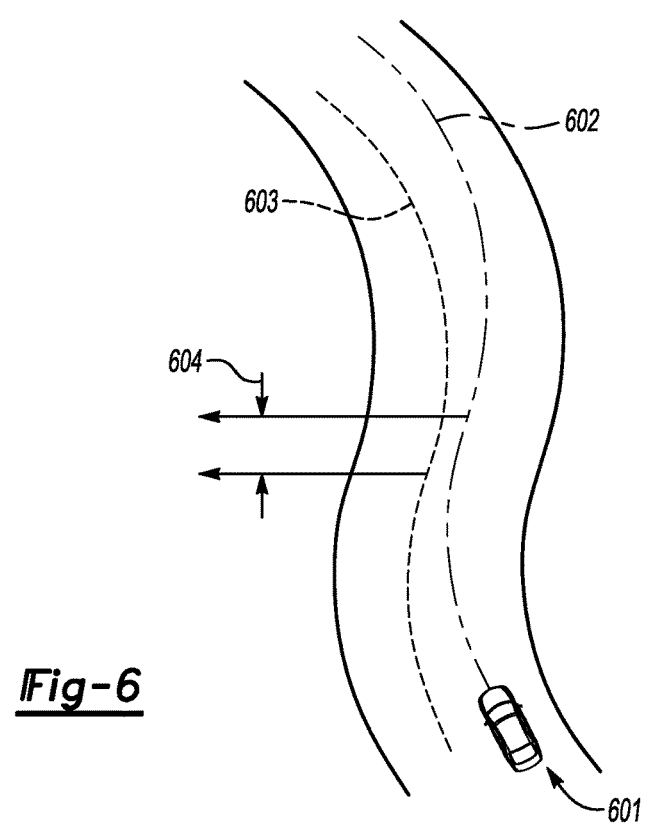
FIG. 6 shows an illustration showing a longitudinal error in a position determined from global navigation information according to an aspect of an exemplary embodiment.

FIG. 6 shows an illustration showing a longitudinal error in a position determined from global navigation information according to an aspect of an exemplary embodiment.

Referring to FIG. 6, a vehicle 601 traveling along a path with curvature is shown. The controller of the vehicle 601 may determine first curvature information 602 based on mapping information of the path corresponding to a location provided by the global navigation information. The controller 101 of the vehicle 601 may also determine second curvature information 603 of the path based on an image of the path taken by a camera, image sensor, or other sensor. The controller 101 may then compare the first curvature information 602 to the second curvature information 603 to determine a longitudinal error 604. The longitudinal error may be used to adjust the position of the vehicle by determining an adjustment value used to adjust a position of the first curvature information 602 to match up to a position of the second curvature information 603 such that a difference between the first curvature information 602 and the second curvature information 603 is less than a predetermined threshold. The adjustment value may then be used to adjust to the position of the vehicle that is being provided by the global navigation information.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for determining an error in global navigation information, the method comprising:
    detecting a first position based on a global navigation information;
    analyzing high resolution mapping data corresponding to the detected first position to determine a first lateral distance between a first side of the detected first position and a first side of a path lateral to the detected first position and a second lateral distance between a second side of the detected first position and a second side of the path lateral to the detected first position;
    detecting a second position based on a global navigation information;
    analyzing high resolution mapping data corresponding to the detected second position to determine a third lateral distance between the first side of the detected second position and the first side of the path lateral to the detected second position and a fourth lateral distance between the second side of the detected second position and the second side of the path lateral to the detected second position; and
    determining an error in the first position based on at least two from among the first lateral distance, the second lateral distance, the third lateral distance and the fourth lateral distance.

2. The method of claim 1, wherein the high resolution mapping data comprises mapping data compiled from a light imaging, detection and ranging sensor and stored in memory.

3. The method of claim 1, wherein the determining the error in the first position comprises determining the error based on a difference between the first lateral distance and third lateral distance.

4. The method of claim 1, wherein the determining the error in the first position comprises determining the error based on a difference between the second lateral distance and fourth lateral distance.

5. The method of claim 1, further comprising:
    determining an adjustment value to adjust the detected first position based on the determined error; and
    transmitting or storing the adjustment value and the detected first position corresponding to the adjustment value.

6. The method of claim 1, wherein the adjustment value comprises a lateral offset added to the detected first position.

7. The method of claim 1, wherein the global navigation information comprises at least one from among GPS information, GLONASS information, BeiDou information, Compass information, IRNSS information and information from a wireless communication or satellite based navigation system.

8. A non-transitory computer readable medium comprising computer instructions executable to perform the method of claim 1.

9. An apparatus that determines an error in global navigation information, the apparatus comprising:
    at least one memory comprising computer executable instructions; and
    at least one processor configured to read and execute the computer executable instructions, the computer executable instructions causing the at least one processor to:
    detect a first position based on a global navigation information;
    determine at least one from among a lateral error and longitudinal error at the detected first position based on high resolution mapping data;
    determine an adjustment value based on determined at least one from among the lateral error and the longitudinal error; and
    transmit or store the adjustment value and the detected first position corresponding to the adjustment value,
    wherein the computer executable instructions cause the at least one processor to determine the lateral error at the detected first position by:
    analyzing high resolution mapping data corresponding to the detected first position to determine a first lateral distance between a first side of the detected first position and a first side of a path lateral to the detected first position and a second lateral distance between a second side of the detected first position and a second side of the path lateral to the detected first position;
    detecting a second position based on a global navigation information;
    analyzing high resolution mapping data corresponding to the detected second position to determine a third lateral distance between the first side of the detected second position and the first side of the path lateral to the detected second position and a fourth lateral distance between the second side of the detected second position and the second side of the path lateral to the detected second position; and
    determining the lateral error in the first position based on at least two from among the first lateral distance, the second lateral distance, the third lateral distance and the fourth lateral distance.

10. The apparatus of claim 9, wherein the computer executable instructions cause the at least one processor to determine the longitudinal error at the detected first position by:
    analyzing high resolution mapping data corresponding to the detected first position to determine first curvature information of the path corresponding to the detected first position;
    analyzing data from a sensor that senses second curvature information of the path around the sensor;
    comparing the first curvature information to the second curvature information to determine whether there is an error in the detected position; and
    in response to determining that there is an error in detected position, aligning the first curvature information and the second curvature information and determining the adjustment value used to align the first curvature information and the second curvature information.

11. The apparatus of claim 9, wherein the global navigation information comprises at least one from among GPS information, GLONASS information, BeiDou information, Compass information, IRNSS information and information from a wireless communication or satellite based navigation system, and wherein the high resolution mapping data comprises mapping data compiled from a light imaging, detection and ranging sensor and stored in memory.

\* \* \* \* \*